United States Patent
Shin et al.

(10) Patent No.: US 12,244,565 B2
(45) Date of Patent: Mar. 4, 2025

(54) HIGH-SPEED NETWORK PACKET PAYLOAD INSPECTION SYSTEM BASED ON EBPF (EXTENDED BERKELEY PACKET FILTER)/XDP (EXPRESS DATA PATH) FOR CONTAINER ENVIRONMENT

(71) Applicants: KOREA ADVANCED INSTITUTE OF SCIENCE AND TECHNOLOGY, Daejeon (KR); S2W INC., Seongnam-si (KR)

(72) Inventors: Seung Won Shin, Daejeon (KR); Myoung Sung You, Daejeon (KR); Sang Duk Suh, Seongnam-si (KR); Chang Hoon Yoon, Seongnam-si (KR); Yeon Keun Kim, Yongin-si (KR)

(73) Assignees: KOREA ADVANCED INSTITUTE OF SCIENCE AND TECHNOLOGY, Daejeon (KR); S2W INC., Seongnam-si (KR)

( * ) Notice: Subject to any disclaimer, the term of this patent is extended or adjusted under 35 U.S.C. 154(b) by 243 days.

(21) Appl. No.: 17/860,333

(22) Filed: Jul. 8, 2022

(65) Prior Publication Data
US 2023/0231830 A1    Jul. 20, 2023

(30) Foreign Application Priority Data
Jan. 18, 2022  (KR) .......................... 10-2022-0006935

(51) Int. Cl.
*H04L 9/40*          (2022.01)
(52) U.S. Cl.
CPC ...... *H04L 63/0254* (2013.01); *H04L 63/0227* (2013.01); *H04L 63/0245* (2013.01);
(Continued)

(58) Field of Classification Search
CPC ............. H04L 63/0254; H04L 63/0227; H04L 63/0245; H04L 63/0263; H04L 63/1408; H04L 63/1416; H04L 63/145; H04L 63/20
See application file for complete search history.

(56) References Cited

U.S. PATENT DOCUMENTS

| | | | |
|---|---|---|---|
| 11,943,261 B1 * | 3/2024 | Durand | H04L 63/20 |
| 2006/0136570 A1 * | 6/2006 | Pandya | H04L 67/10 |
| | | | 709/217 |

(Continued)

FOREIGN PATENT DOCUMENTS

| | | |
|---|---|---|
| KR | 10-2015-0100926 A | 9/2015 |
| KR | 10-2018-0122019 A | 11/2018 |

OTHER PUBLICATIONS

Myoungsung You, et al., "eBPF/XDP-based high-performance packet payload inspection system for container environments", pp. 1-5, Nov. 5, 2021.

*Primary Examiner* — Cheng-Feng Huang
(74) *Attorney, Agent, or Firm* — Sughrue Mion, PLLC (57) ABSTRACT

According to the present specification, a method for inspecting a high-speed network packet payload by a terminal includes: a step of receiving L7 (Layer 7) policy related to containers from a user; a step of extracting string patterns to be inspected for each of the containers on the basis of the L7 policy through a pattern compiler; a step of creating a deterministic finite automaton (DFA) on the basis of the extracted string patterns through the pattern complier; and a step of converting a state transition table of the deterministic finite automaton into a match-action table through the pattern compiler and storing the match-action table in an eBPF (extended Berkeley Packet Filter) map for a payload inspection engine.

9 Claims, 4 Drawing Sheets

(52) U.S. Cl.
CPC ...... *H04L 63/0263* (2013.01); *H04L 63/1408* (2013.01); *H04L 63/1416* (2013.01); *H04L 63/145* (2013.01); *H04L 63/20* (2013.01)

(56) References Cited

U.S. PATENT DOCUMENTS

2017/0208037 A1* 7/2017 Hay .................... H04L 63/0245
2019/0173841 A1   6/2019 Wang et al.
2022/0217120 A1* 7/2022 Flavel ................. H04L 63/0263

* cited by examiner

HIGH-SPEED NETWORK PACKET PAYLOAD INSPECTION SYSTEM BASED ON EBPF (EXTENDED BERKELEY PACKET FILTER)/XDP (EXPRESS DATA PATH) FOR CONTAINER ENVIRONMENT

TECHNICAL FIELD

The present specification relates to a method of configuring a high-speed network packet payload inspection system based on eBPF/XDP for a container environment, and an apparatus for the method.

BACKGROUND ART

A Linux container is an OS-level virtualization technology, and means a set of processes (e.g., process, file system, network) isolated from the rest of a system. A host kernel can be shared and used by all containers, and the container is characterized by being lighter than the existing hardware-level virtualization machine (VM). Currently, most cloud services are operating in a container environment. For example, such cloud services may be operated in the form of a micro service architecture, and each micro service may be executed in a container.

An eBPF is a virtual machine in a Linux kernel developed for a network packet processing. A program written in eBPF byte codes can operate at high speed in a kernel area.

An XDP means a network hook in a Linux kernel in which an eBPF program can be registered and executed. The registered program can operate at high speed in a device driver level, and can process a packet before sk buff allocation. Through this, it is possible to process a packet before a kernel network stack.

SUMMARY OF INVENTION

Technical Problem

An object of the present specification is to provide a high-speed network packet payload inspection system based on eBPF/XDP for a container environment.

Technical problems to be achieved by the present specification are not limited to the technical problems mentioned above, and other technical problems not mentioned may be clearly understood by those of ordinary skill in the art to which the present specification belongs from detailed description of the following specification.

Solution to Problem

According to an aspect of the present specification, a method for inspecting a high-speed network packet payload by a terminal may comprise: a step of receiving L7 (Layer 7) policy related to containers from a user; a step of extracting string patterns to be inspected for each of the containers on the basis of the L7 policy through a pattern compiler; a step of creating a deterministic finite automaton (DFA) on the basis of the extracted string patterns through the pattern complier; and a step of converting a state transition table of the deterministic finite automaton into a match-action table through the pattern compiler and storing the match-action table in an eBPF (extended Berkeley Packet Filter) map for a payload inspection engine.

In addition, the pattern complier may be positioned in a user space, and the payload inspection engine may be positioned in a kernel space.

In addition, the deterministic finite automaton may have a structure for detecting the extracted string patterns.

In addition, the pattern compiler may monitor a platform related to the container to detect change in the L7 policy.

In addition, the method may further comprise a step of extracting a payload from a packet through the payload inspection engine when the packet is transmitted from a specific container; and a step of acquiring a state transition table from an eBPF map related to the specific container and inspecting a pattern of the payload through the payload inspection engine.

In addition, the method may further comprise a step of delivering the packet to a target container when the pattern of the payload matches on the basis of the state transition table.

In addition, the method may further comprise a step of dropping the packet when the pattern of the payload does not match on the basis of the state transition table.

According to another aspect of the present specification, a system for inspecting a high-speed network packet payload, may comprise: a compiler which extracts string patterns to be inspected for each of containers on the basis of L7 (Layer 7) policy related to the containers input from a user, creates a deterministic finite automaton (DFA) on the basis of the extracted string patterns, and converts a state transition table of the deterministic finite automaton into a match-action table; and a payload inspection engine which receives the match-action table from the pattern compiler and stores the match-action table in an eBPF (extended Berkeley Packet Filter) map.

In addition, according to another aspect of the present specification, a terminal for inspecting a high-speed network packet payload may include: a communication module; a memory; and a processor which functionally controls the communication module and the memory, wherein the processor receives L7 (Layer 7) policy related to containers from a user, extracts string patterns to be inspected for each of the containers on the basis of the L7 policy through a pattern compiler, creates a deterministic finite automaton (DFA) on the basis of the extracted string patterns through the pattern complier, converts a state transition table of the deterministic finite automaton into a match-action table through the pattern compiler, and stores the match-action table in an eBPF (extended Berkeley Packet Filter) map for a payload inspection engine.

Advantageous Effects of Invention

According to the embodiment of the present specification, it is possible to configure a high-speed network packet payload inspection system based on eBPF/XDP for a container environment.

Effects obtainable in the specification are not limited to the effects mentioned above, and other effects not mentioned will be clearly understood by those of ordinary skill in the art to which the present specification belongs from the description below.

The accompanying drawings, which are included as a part of the detailed description to help the understanding of the present specification, provide embodiments of the present specification, and together with the detailed description, explain the technical features of the present specification.

DESCRIPTION OF EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exists in between.

The singular expression includes the plural expression unless the context clearly dictates otherwise.

In the present application, terms such as "include" or "have" are intended to designate that the features, numbers, steps, operations, components, parts, or combinations thereof described in the specification exist, but it should be understood that the possibility of presence or addition of one or more other features, numbers, steps, operations, components, parts, or combinations thereof is not excluded.

Figure 1:
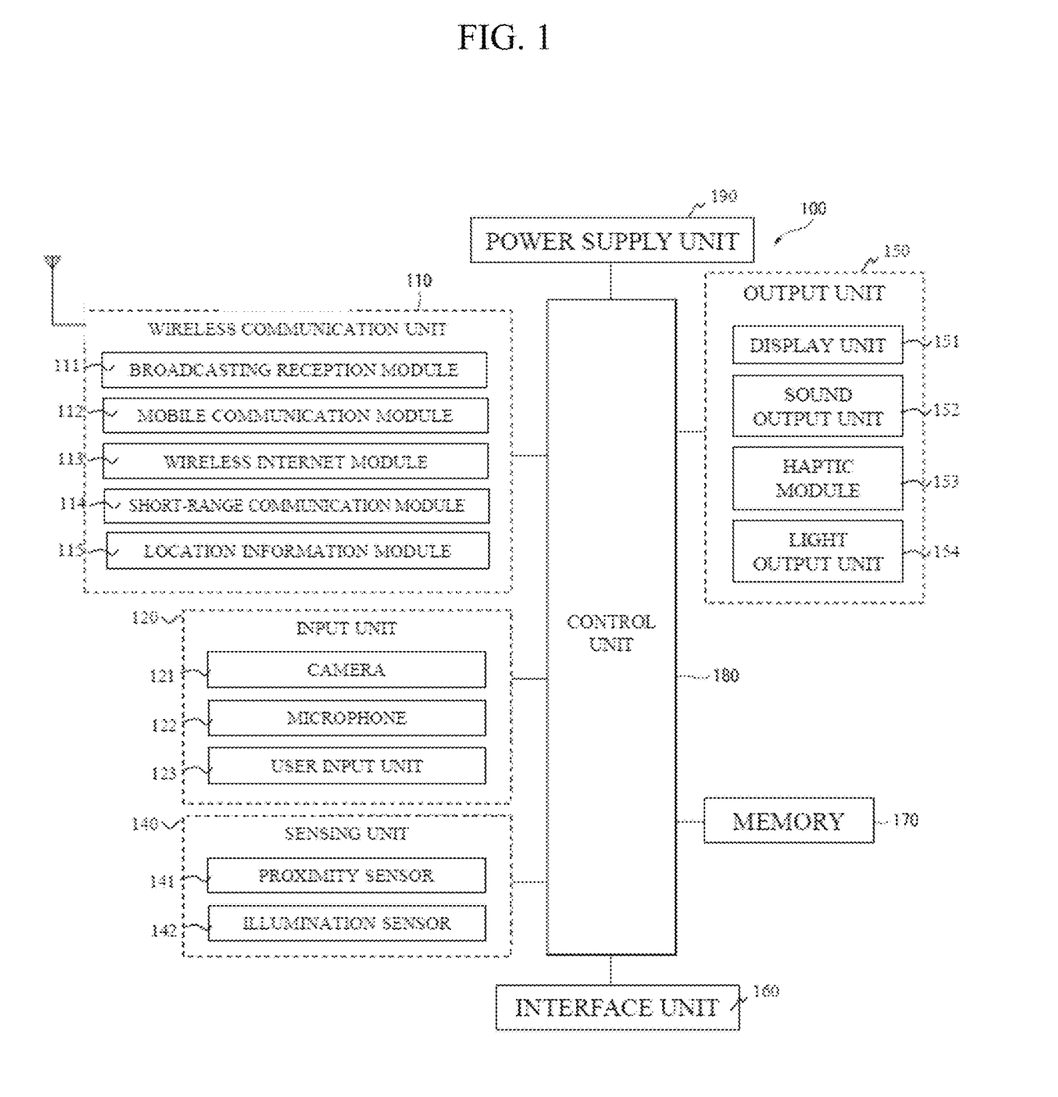
FIG. 1 is a block diagram illustrating an electronic apparatus related to the present specification.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of application programs (or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power, and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

Figure 2:
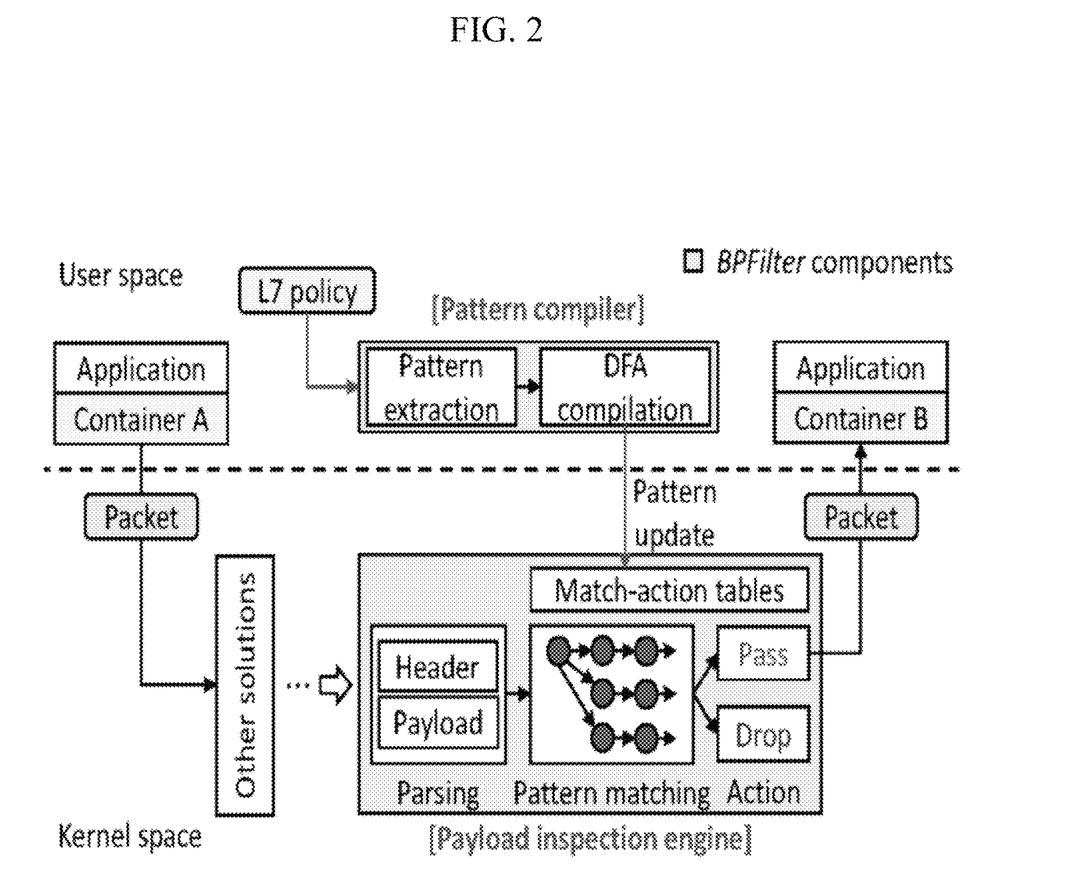
FIG. 2 is a diagram illustrating an example of a high-speed network packet payload inspection system according to the present specification.

FIG. 2 is a diagram illustrating an example of a high-speed network packet payload inspection system according to the present specification.

Containers are being used as a core technology for large-scale microservices by major cloud service providers such as Amazon and Google. This aggressive introduction has also brought about an increase in security threats posed by containers. Containers are connected to each other through a virtual network for service configuration. For this reason, an attacker may attack other adjacent containers or paralyze the entire system through network attacks such as TCP (transmission control protocol) session hijacking, and DNS (domain name system) spoofing from the hijacked container.

In the past, in order to prevent such a threat, network attacks that could occur between containers were prevented by restricting communication of containers by filtering packets transmitted by a container according to network policy. However, these may cause a very large network performance degradation in the process of inspecting the payload of the packet.

For example, since containers mainly communicate using L7 protocol such as HTTP, packet payload inspection for L7 access control is essential for network security. Accordingly, enabling payload inspection may reduce inter-container communication performance (e.g., network latency, throughput) by more than 50%. Such current solutions difficult to be applied to services that are sensitive to network delay require high network throughput, such as AR/VR.

Referring to FIG. 2, in order to solve the above-described problems, a BPFilter which is a high-performance packet payload inspection system for container environments, is illustrated.

The BPFilter is a system which inspects a payload of a packet transmitted from a container at high speed using only an eBPF program, and includes (1) a pattern compiler and (2) a payload inspection engine.

The pattern complier may operate in a user area, extract string patterns to be inspected from L7 policy input by a user, then convert string patterns into the form that can be processed in the eBPF program, and store the form in the eBPF map.

The payload inspection engine is an eBPF program that is executed on a Linux kernel XDP hook, and may inspect a payload of a packet transmitted from a container at high speed in accordance with an eBPF map created by the pattern compiler and discard a packet against policy to restrict L7 communication between containers.

Figure 3:
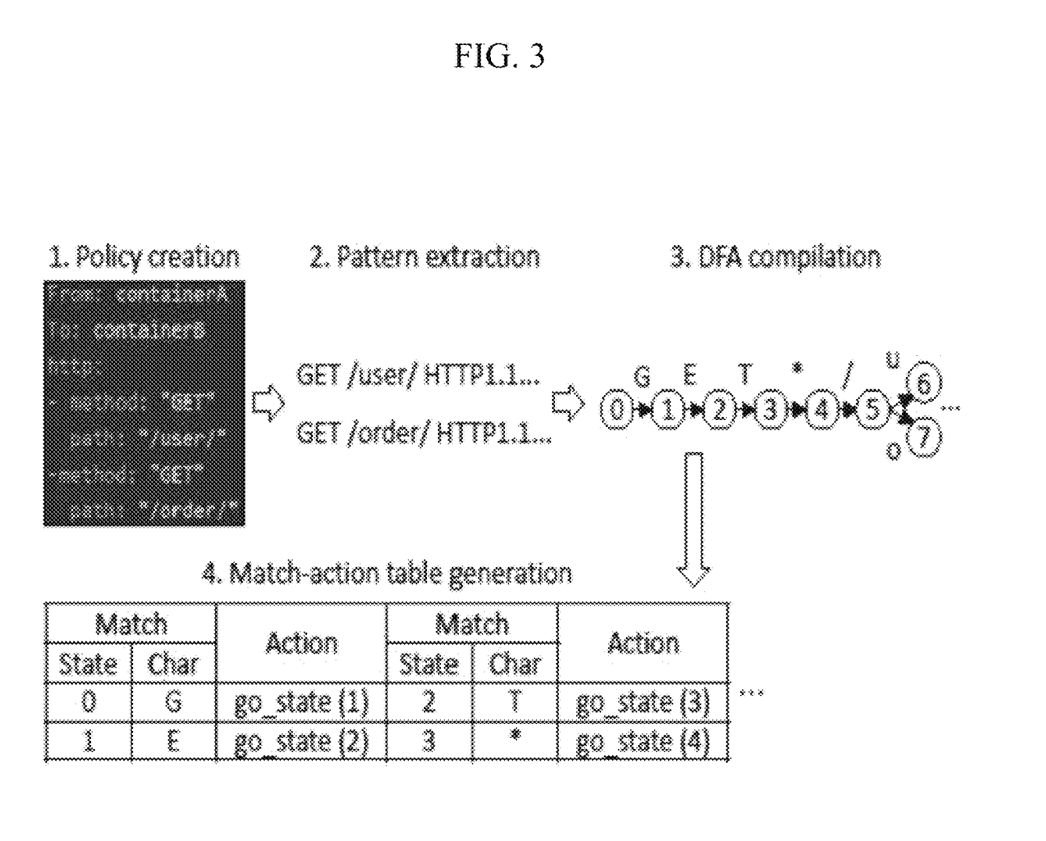
FIG. 3 is a diagram illustrating an embodiment of a pattern complier according to the present specification.

FIG. 3 is a diagram illustrating a pattern compiler according to the present specification.

Referring to FIG. 3, the pattern compiler may use a multiple pattern matching algorithm based on an automaton utilizing an eBPF map to implement payload inspection in a kernel level. The following is an embodiment of the pattern complier.

1. A user may input L7 policy to be inspected for each container.

2. The pattern complier may extract string patterns to be inspected for each container from the policy.

3. The pattern complier creates a deterministic finite automaton capable of detecting the extracted patterns.

4. The pattern complier converts a state transition table of the created automaton into the form of a match-action table utilized in a general network packet processing, and stores it in an eBPF map allocated for each container.

Through this, the eBPF program may detect a plurality of patterns at once similarly to an Aho-Corasick algorithm by querying the eBPF map using each byte key of a payload without using a separate data structure or implementing an algorithm.

For example, the pattern complier may continuously monitor a container platform such as Kubernetes to detect change in network policy. Through this, the pattern complier may newly compile a pattern in accordance with the change in policy, and then store the pattern in the eBPF map to always keep the eBPF map used by the payload inspection engine up to date.

Referring to FIG. 2 again, the payload inspection engine may be a linear state machine implemented by the eBPF program. The payload inspection engine may be registered in an XDP hook of a network device used when a container transmits a packet, and be executed whenever the container transmits a packet.

The payload inspection engine may first analyze a header of the packet transmitted from the container and extract only a payload part. Thereafter, the payload inspection engine may take the state transition table of the automaton from the eBPF map assigned to the container, then read the payload by bytes based thereon, and transit the state of the automaton, thereby inspecting whether patterns appear.

Only when the payload inspection engine finds a completely matching pattern from the payload of the packet, the payload inspection engine may transmit the packet to a target container. The payload inspection engine may adjust an execution order such that other security solutions are executed after the eBPF program registered in the kernel XDP hook, and thus may be utilized like add-on for inspecting a payload of other solutions.

Figure 4:
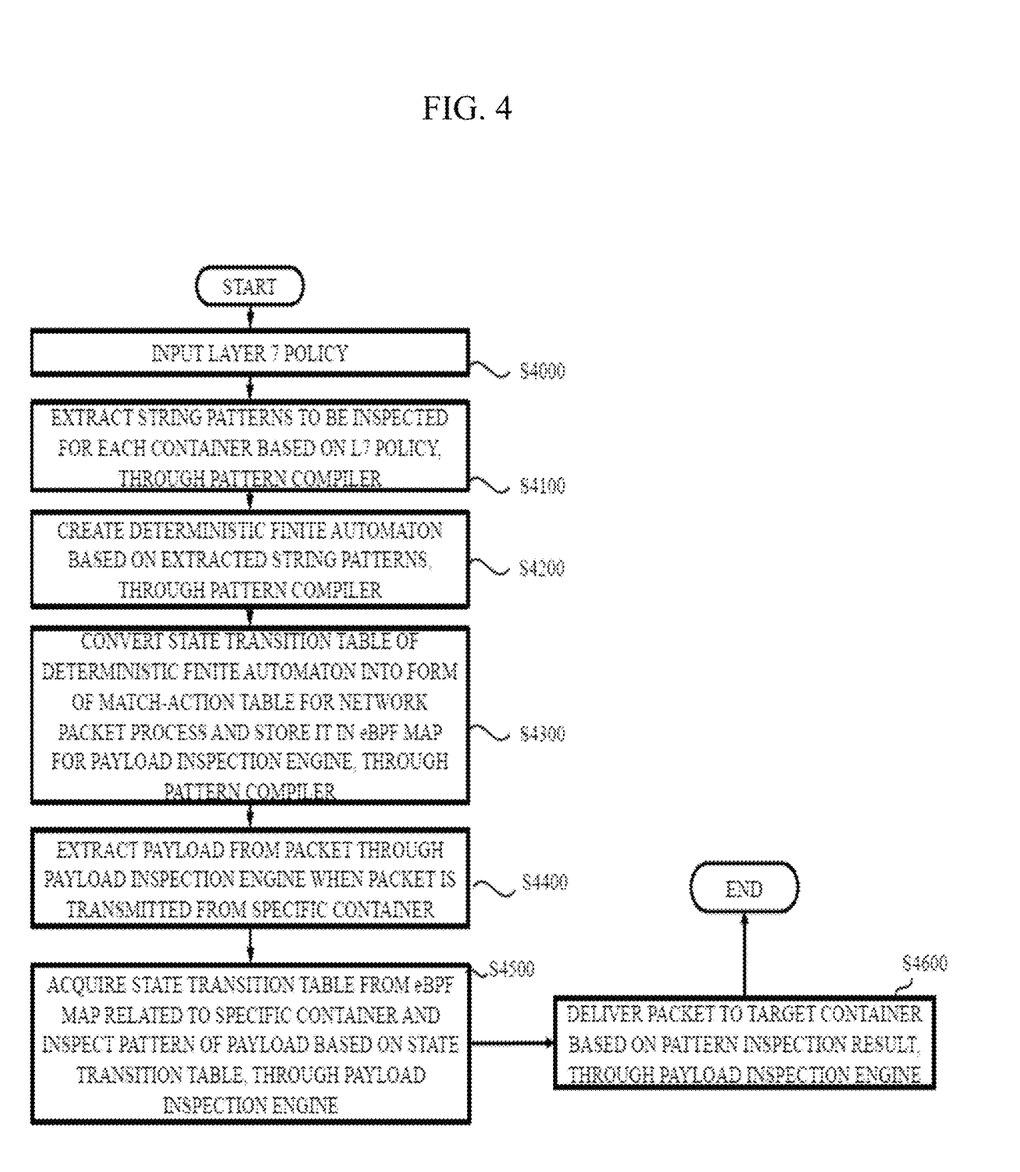
FIG. 4 is a diagram illustrating an embodiment according to the present specification.

FIG. 4 is a diagram illustrating an embodiment according to the present specification.

Referring to FIG. 4, the terminal may include the above-described high-speed network packet payload inspection system.

The terminal receives Layer 7 (L7) policy (S4000). For example, a user may input L7 policy to be inspected for each container to the terminal.

The terminal extracts string patterns to be inspected for each container on the basis of the L7 policy through the pattern complier (S4100). For example, the patter complier may be included in a user space.

The terminal creates a deterministic finite automaton (DFA) on the basis of the extracted string patterns through the pattern complier (S4200). For example, the deterministic finite automaton may have a structure for detecting the extracted patterns.

The terminal converts the state transition table of the deterministic finite automaton into the form of a match-action table for a network packet processing through the pattern complier, and stores it in the eBPF (extended Berkeley Packet Filter) map for the payload inspection engine (S4300).

For example, the pattern complier may monitor the container platform to detect change in L7 policy. When the change is detected, the pattern complier may update the eBPF map.

When a packet is transmitted from a specific container, the terminal extracts a payload from the packet through the payload inspection engine (S4400). For example, the payload may be extracted by analyzing the header of the packet.

The terminal acquires the state transition table from the eBPF map related to the specific container through the payload inspection engine, and inspects the pattern of the payload on the basis of the state transition table (S4500).

The terminal delivers the packet to a target container on the basis of the pattern inspection result through the payload inspection engine (S4600). For example, when the pattern completely matches, the payload inspection engine may deliver the packet to the target container.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include what is implemented in a form of carrier wave (e.g., transmission through the Internet). Accordingly, the above detailed description should not be construed as restrictive in all respects and should be considered as exemplary. The scope of the present specification should be determined by a reasonable interpretation of the appended claims, and all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

The invention claimed is:

1. A method for inspecting a high-speed network packet payload by a terminal, the method comprising:
    a step of receiving L7 (Layer 7) policy related to containers from a user;
    a step of extracting string patterns to be inspected for each of the containers on the basis of the L7 policy through a pattern compiler;
    a step of creating a deterministic finite automaton (DFA) on the basis of the extracted string patterns through the pattern complier; and
    a step of converting a state transition table of the DFA into a match-action table through the pattern compiler and storing the match-action table in an eBPF (extended Berkeley Packet Filter) map for a payload inspection engine,
    wherein the match-action table is a table representing relation among states of the DFA and actions corresponding to the states.

2. The method according to claim 1, wherein the pattern complier is positioned in a user space, and the payload inspection engine is positioned in a kernel space.

3. The method according to claim 2, wherein the deterministic finite automaton has a structure for detecting the extracted string patterns.

4. The method according to claim 2, wherein the pattern compiler monitors a platform related to the container to detect change in the L7 policy.

5. The method according to claim 2, further comprising:
    a step of extracting a payload from a packet through the payload inspection engine when the packet is transmitted from a specific container; and
    a step of acquiring a state transition table from an eBPF map related to the specific container and inspecting a pattern of the payload through the payload inspection engine.

6. The method according to claim 5, further comprising a step of delivering the packet to a target container when the pattern of the payload matches on the basis of the state transition table.

7. The method according to claim 5, further comprising a step of dropping the packet when the pattern of the payload does not match on the basis of the state transition table.

8. A system for inspecting a high-speed network packet payload, the system comprising:
    a compiler circuitry which extracts string patterns to be inspected for each of containers on the basis of L7 (Layer 7) policy related to the containers input from a user, creates a deterministic finite automaton (DFA) on the basis of the extracted string patterns, and converts a state transition table of the DFA into a match-action table; and
    a payload inspection engine which receives the match-action table from the pattern compiler and stores the match-action table in an eBPF (extended Berkeley Packet Filter) map,
    wherein the match-action table is a table representing relation among states of the DFA and actions corresponding to the states.

9. A terminal for inspecting a high-speed network packet payload, the terminal comprising:
    a communication module;

a memory; and a hardware processor which functionally controls the communication module and the memory, wherein the processor receives L7 (Layer 7) policy related to containers from a user, extracts string patterns to be inspected for each of the containers on the basis of the L7 policy through a pattern compiler, creates a deterministic finite automaton (DFA) on the basis of the extracted string patterns through the pattern complier, converts a state transition table of the DFA into a match-action table through the pattern compiler, and stores the match-action table in an eBPF (extended Berkeley Packet Filter) map for a payload inspection engine, wherein the match-action table is a table representing relation among states of the DFA and actions corresponding to the states.

\* \* \* \* \*